(12) United States Patent
Huin et al.

(10) Patent No.: US 9,383,974 B2
(45) Date of Patent: *Jul. 5, 2016

(54) GRAPHICAL COMPUTER PROGRAMMING

(75) Inventors: Camille Huin, Cambridge, MA (US); Miguel A. Chavez, Cambridge, MA (US)

(73) Assignee: Analog Devices, Inc., Norwood, MA (US)

( * ) Notice: Subject to any disclaimer, the term of this patent is extended or adjusted under 35 U.S.C. 154(b) by 218 days.

This patent is subject to a terminal disclaimer.

(21) Appl. No.: 12/906,851

(22) Filed: Oct. 18, 2010

(65) Prior Publication Data

US 2011/0088012 A1    Apr. 14, 2011

Related U.S. Application Data

(63) Continuation of application No. 10/865,562, filed on Jun. 10, 2004, now Pat. No. 7,827,526.

(60) Provisional application No. 60/478,902, filed on Jun. 13, 2003.

(51) Int. Cl.
*G06F 9/44* (2006.01)
*G06F 3/048* (2013.01)

(52) U.S. Cl.
CPC ........................................ *G06F 8/34* (2013.01)

(58) Field of Classification Search
USPC .......................................................... 717/109
See application file for complete search history.

(56) References Cited

U.S. PATENT DOCUMENTS

| 5,291,587 | A | * | 3/1994 | Kodosky | G06F 3/0481 345/440 |
| 5,386,568 | A | * | 1/1995 | Wold et al. | 717/162 |
| 5,966,532 | A | * | 10/1999 | McDonald | G06F 8/34 707/999.101 |
| 6,053,951 | A | * | 4/2000 | McDonald et al. | 717/109 |
| 6,701,513 | B1 | * | 3/2004 | Bailey | 717/109 |

(Continued)

*Primary Examiner* — Marina Lee
(74) *Attorney, Agent, or Firm* — Sunstein Kann Murphy & Timbers LLP

(57) ABSTRACT

A computer program product and method for using a computer program product for graphically developing a computer program for execution at least in part on a separate host processor device, such as, a digital signal processor. The computer program product includes code for providing a graphical programming environment. The computer code which is used for developing the computer program includes a cell module for graphically representing a graphical control. The cell module does not contain any host processor specific code. The cell module may include code for rendering on the display of the computer that is operating as the programming environment one or more graphical controls. The cell module may also contain host processor independent code that accepts input from a user (parameter value) and converts the parameter value or applies an equation to the parameter value. The computer program also includes a plurality of algorithm modules, wherein each algorithm module provides functional code for the graphical control. The functional code is host processor specific code. The computer program also includes computer code for associating the cell module with one or more of the plurality of algorithm modules for developing the computer program. The computer program also includes code for defining an execution path amongst the algorithm modules. This can be achieved by graphically connecting the cell modules and defining an input and output.

22 Claims, 14 Drawing Sheets

Cell and Algorithm Concept

(56) References Cited

U.S. PATENT DOCUMENTS

| | | | | |
|---|---|---|---|---|
| 6,738,964 B1* | 5/2004 | Zink | G06F 17/5045 | 715/763 |
| 6,802,053 B1* | 10/2004 | Dye et al. | | 717/113 |
| 7,080,324 B1* | 7/2006 | Nelson | G06F 3/04847 | 715/771 |
| 7,120,874 B2* | 10/2006 | Shah | G06F 8/34 | 709/223 |
| 7,120,876 B2* | 10/2006 | Washington | G06F 8/34 | 715/763 |
| 7,134,090 B2* | 11/2006 | Kodosky et al. | | 715/769 |
| 7,187,777 B1* | 3/2007 | Saffran | | 381/306 |
| 7,206,415 B2* | 4/2007 | Monks et al. | | 381/58 |
| 7,340,721 B1* | 3/2008 | Bailey | G06F 8/34 | 717/109 |
| 7,376,904 B2* | 5/2008 | Cifra | G05B 19/0426 | 715/762 |
| 7,689,917 B2* | 3/2010 | Washington | G06F 8/34 | 715/717 |
| 7,827,526 B2* | 11/2010 | Huin | G06F 8/34 | 715/763 |
| 7,844,911 B2* | 11/2010 | Austin | G06F 3/0481 | 709/217 |
| 7,913,170 B2* | 3/2011 | Rogers | G06F 3/0481 | 715/735 |
| 7,937,665 B1* | 5/2011 | Vazquez | G05B 19/0426 | 715/763 |
| 2003/0198353 A1* | 10/2003 | Monks et al. | | 381/58 |
| 2004/0233237 A1* | 11/2004 | Randow | G06F 8/34 | 715/763 |
| 2004/0264704 A1* | 12/2004 | Huin et al. | | 381/59 |
| 2004/0268300 A1* | 12/2004 | Huin et al. | | 717/107 |
| 2004/0268320 A1* | 12/2004 | Huin et al. | | 717/135 |
| 2005/0010900 A1* | 1/2005 | Huin et al. | | 717/109 |
| 2005/0262451 A1* | 11/2005 | Remignanti et al. | | 715/833 |
| 2006/0212147 A1* | 9/2006 | McGrath et al. | | 700/94 |
| 2011/0083091 A1* | 4/2011 | Huin et al. | | 715/771 |

\* cited by examiner

Cell and Algorithm Concept

GRAPHICAL COMPUTER PROGRAMMING

The present U.S. Patent Application is a continuation of U.S. patent application Ser. No. 10/865,562 entitled "Stacking and Repeating Graphical Controls" filed on Jun. 10, 2004, issued as U.S. Pat. No. 7,827,526, and also claims priority from U.S. Provisional Patent Application No. 60/478,902 entitled "Graphical Computer Programming" filed on Jun. 13, 2003, both of which are incorporated herein by reference in their entirety. The present U.S. Patent Application is also related to U.S. patent application Ser. No. 10/865,051 filed on Jun. 10, 2004 entitled "Graphical Computer Programming for a Digital Signal Processor," now abandoned, and U.S. patent application Ser. No. 10/865,561, filed Jun. 10, 2004 entitled "Graphical Computer Programming" now abandoned, both of which are incorporated herein by reference in their entirety as a result of having been incorporated by reference in their entirety in priority U.S. patent application Ser. No. 10/865,562.

TECHNICAL FIELD AND BACKGROUND ART

The present invention relates to computer software programming tools and more specifically in one embodiment to programming tools for use with digital signal processors.

It is well known in the prior art to have a text based programming suite for writing computer code for digital signal processors such as products by Analog Devices (Visual DSP), Motorola, (68K Compiler), and Texas Instruments (T1-C8X PC C Compiler/Assembler/Linker). The programming suites generally require the programmer to code in assembly language or in a mid-level programming language, such as C, using text based programming.

Because programming languages require a great deal of experience and knowledge regarding the language's semantics and syntax, there has been a recent interest in using graphical tools to assist in programming. Such graphical tools have not been designed to program digital signal processors but have been implemented to assist in general programming of mid-level languages. Most of such graphical tools allow a programmer to select functions to be implemented graphically. The functions are generally provided in toolboxes that group the functions together by use. This graphical user interface allows a programmer to graphically select a function and to drag and drop the desired function onto a page and then to link the functions together. The manner in which the functions are linked together determines the execution order of the functions. The graphical user interface and the software code are linked together and may be considered to be a module within the toolbox. The module is defined as a single linked entity. As updates occur, new code is required for the entire module no matter what has changed in the code. Problems arise for the person overseeing the programming suite as revisions occur. For example, if there are many variations of a particular module, for example, graphical template each having a different color, the code for each template needs to be updated and the revisions need to be managed by the overseer of the module library.

SUMMARY OF THE INVENTION

A computer program product and method for using a computer program product for graphically developing a computer program for execution at least in part on a separate host processor device, such as, a digital signal processor is described. The computer program product includes code providing a graphical programming environment. The computer code which is used for developing the computer program includes a cell module for graphically representing a graphical control. The cell module does not contain any host processor specific code. The cell module may include code for rendering on the display of the computer that is operating as the programming environment one or more graphical controls. The cell module may also contain host processor independent code that accepts input from a user (parameter value(s)) and converts the parameter value or applies an equation to the parameter value. The computer program also includes a plurality of algorithm modules, wherein each algorithm module provides functional code for the graphical control. The functional code is host processor specific code. The computer program also includes computer code for associating the cell module with one or more of the plurality of algorithm modules for developing the computer program. The computer program also includes code for defining an execution path amongst the algorithm modules. This can be achieved by graphically connecting the cell modules and defining an input and output.

Each algorithm module provides functional code for Signal Processing Control. Signal processing control implies that the code functions to control a digital signal processor. The algorithm module also includes code known as a graphical module that contains functional graphical control code. The graphical module allows the algorithm module to operate on the host processor and to receive parameter values from a separate computer. The graphical module controls access by the remote processor to the parameter values. The functional code is compilable code and may be pre-compiled or compiled after the cell module and the algorithm module are associated. The functional code may be machine-readable code or compiler readable code. The functional code of the algorithm module may be pre or post compiler, host processor executable code.

Each algorithm module may have different functional code that is operative on a specific remote processor.

The computer program also includes computer code for compiling the algorithm modules according to the execution path creating a programmed module. The program further includes computer code for sending the programmed module to a remote processor for execution on the remote processor.

The computer program product further includes computer code for receiving parameter input from at least one cell module and providing the parameter input to a list. The algorithm module contains computer code which once compiled and executed on a remote processor will access the parameter input within the list.

The invention as defined by the claims also describes a graphical system for developing programming modules for operation on a remote processor. The graphical system includes a graphical programming workspace viewable on a display device along with a set of selectable cell modules representing graphical controls becoming selected upon being placed into the workspace. The graphical system also includes a functional association module for associating functional code with a selected graphical control wherein the functional code is selectable from a set of functional code, and wherein the set of functional code is provided based upon a selected cell module from a superset of functional code. The graphical system also includes a connection module allowing user connection between two or more cell modules provided in the workspace defining an execution path. The cell module may contain one or more object files and the object files define a graphical control on a display device.

In certain embodiments, the graphical system includes a compiler module that will compile the functional code according to the execution path. In certain embodiments, the code may be compiled and subsequently converted by a code conversion module that converts the compiled code into remote processor executable code. The remote processor executable code is executable on one or more digital signal processing integrated circuits.

A parameter module for receiving parameter values from one or more cell modules is also included. The parameter module allows a remote processor executing the compiled code to retrieve the parameter values from the parameter module or from a memory location.

The graphical system is capable of receiving input from a user. A user can input selection of one or more digital signal processing chips and the functional association module use the selection of one or more digital signal processing chips to determine the set of functional code that is presented for selection. The functional association module interfaces functional code which can be compiled and executed on a digital signal processor with object code representing the graphical control. Once the computer code is compiled, the computer code can be ported to a digital signal processor and executed on the digital signal processor.

BRIEF DESCRIPTION OF THE DRAWINGS

The foregoing features of the invention will be more readily understood by reference to the following detailed description, taken with reference to the accompanying drawings, in which:

FIG. 5 shows user selection of a cell;

FIG. 6 shows a context menu for adding an algorithm;

FIG. 7 shows the addition of the algorithm;

FIG. 8 shows horizontal stacking and no stacking of an added algorithm;

FIG. 10 shows an initial screen of a cell panel prior to repeating;

FIG. 11 shows a context sensitive window for selection of the repeating process;

FIG. 12 shows a repeated mixer control; and

FIG. 13 shows repeating without repeating the graphical controls;

DETAILED DESCRIPTION OF SPECIFIC EMBODIMENTS

The following description will assume an object oriented programming environment although it is possible to implement the described computer functionality in a non-object oriented programming environment. In the following specification the term "module" will be used interchangeably with the term "object" as is understood in object-oriented programming. A "host processor" includes a processing unit that receives and can execute compiled code and which has associated memory.

Figure 1:
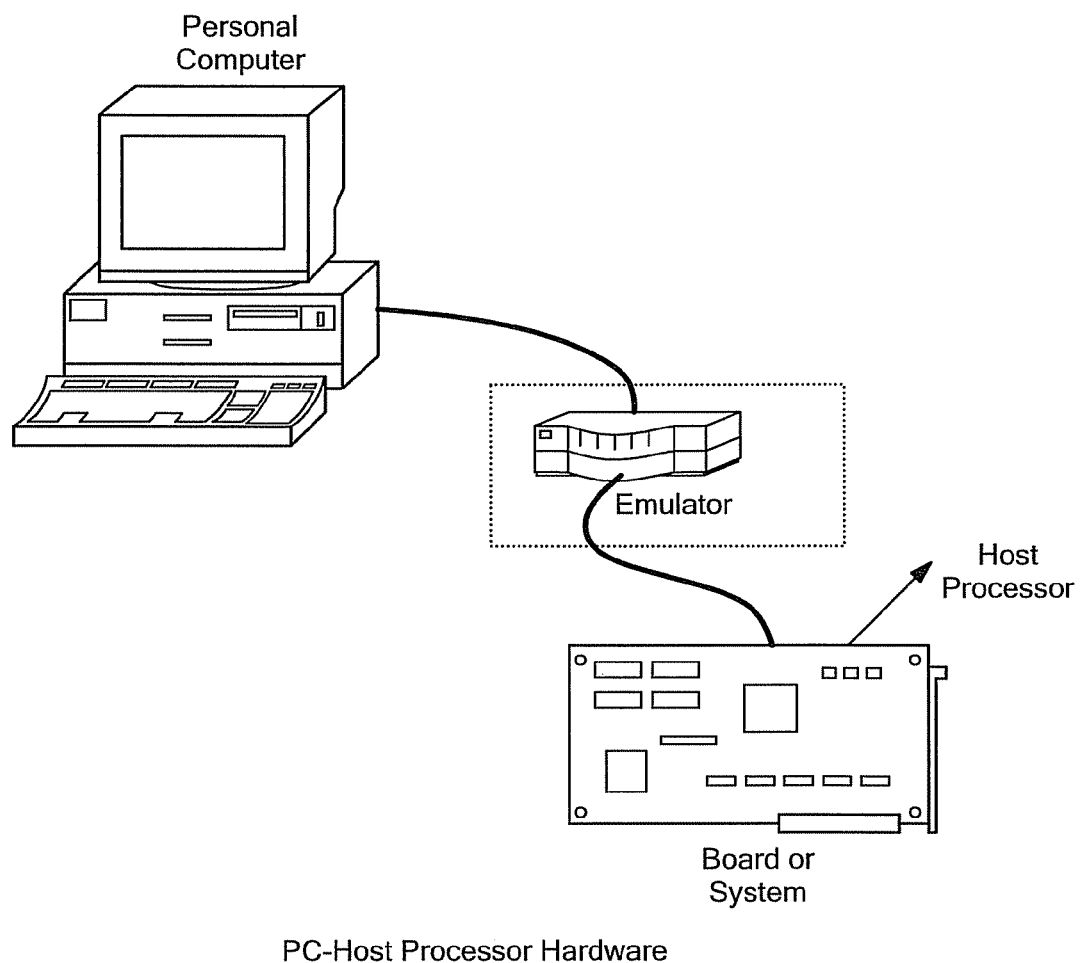
FIG. 1 shows an environment for implementing one embodiment of the invention.

FIG. 1 shows an environment for implementing one embodiment of the invention. A computer is in communication with either an emulator or an interface card. If an emulator is used, the emulator may be software or a hardware emulator that provides signal processor or micro-controller functionality for testing computer code to be run on a host processor, such as, a signal processor or micro-controller. If an interface card is used, the interface card provides a means of communication between the computer and an outboard host processor. The interface card may convert instruction signals between the computer and the host processor in terms of timing and/or number of bits or ordering of bits. In other variations, the computer may be coupled to the host processor without an interface card. The following description will refer to digital signal processors as examples only, and it should be understood that other host processors may be used in various embodiments.

The computer runs a software programming environment that provides a workspace that allows a programmer to graphically select functions to be implemented on the digital signal processor (DSP), a micro controller, or simulated in the emulator. As such, the graphical icons are later associated with computer code that once compiled is capable of being implemented on the host processor defining a signal path. The computer software programming environment allows the graphical icons representative of DSP functions to be linked together in a desired order by the computer programmer. When the graphical icon is dragged and dropped onto the workspace, the graphical object is instantiated. Thus, the graphical objects are precompiled objects. For example, using a DSP to control an audio signal that is to be output to a number of speakers, a computer programmer may select to have the signal first undergo compression in a compressor and then pass through a bass enhancer. The computer programmer graphically selects an icon representing a compressor and then selects a graphical icon representing bass enhancement, thus instantiating the graphical objects for the compressor and the bass enhancement. The computer programmer then connects the output of the compressor to the input of the bass enhancement module, thus delineating the signal path. It should be made clear that the instantiated objects within the workspace are primarily graphical objects and in the preferred embodiment contain no computer code that is to be compiled and implemented in the digital signal processor or other host processor.

The computer programmer couples the graphical object with another object that contains code that is capable of being compiled and executed on the host processor. Parameters are passed between the graphical icon object and the computer code object through an interface. Each graphical object that is instantiated may produce one or more output parameters.

Figure 2:
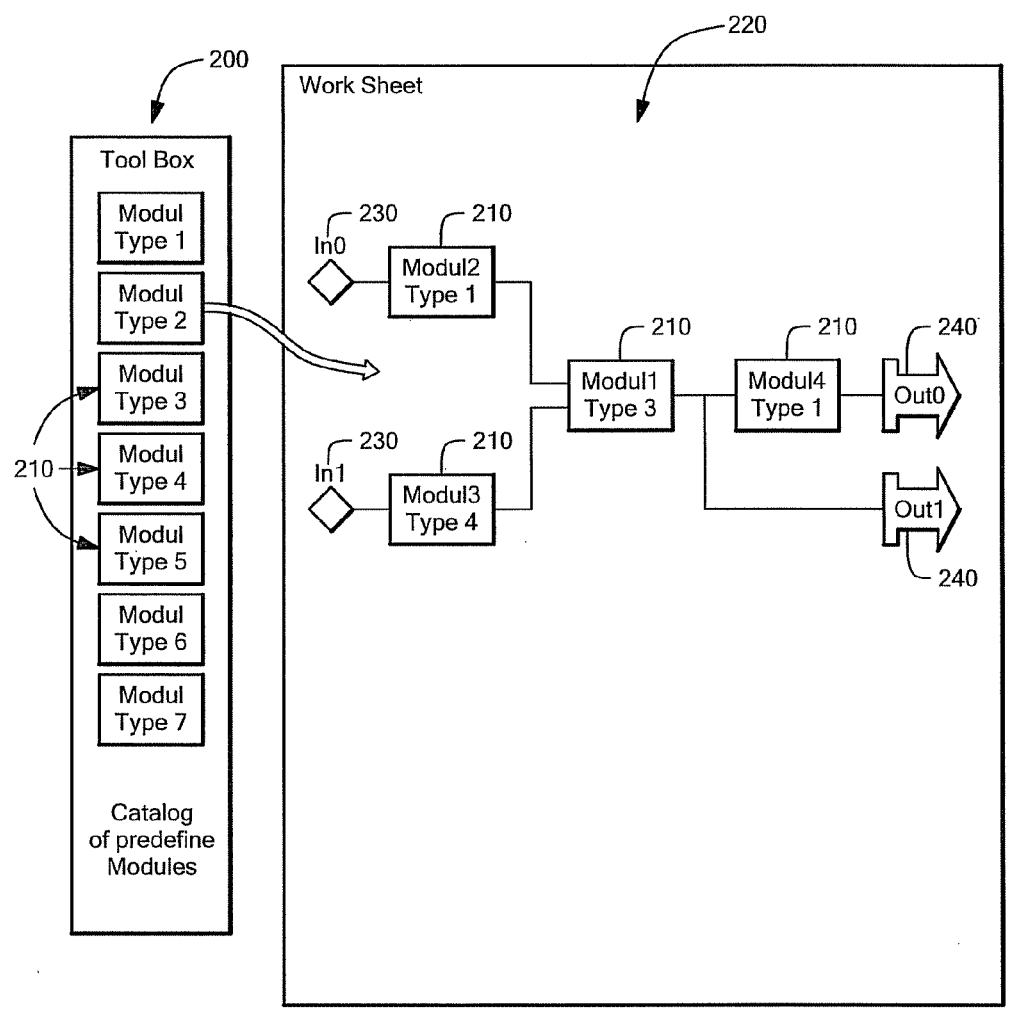
FIG. 2 shows a screen shoot of a graphical programming tool in which a programmer selects modules from a menu (tool box) and links the modules together to create a flow to the code.

FIG. 2 represents a screen of the graphical user interface. A toolbox 200 is displayed on the left most side of the screen which contains a plurality of selectable icons 210. Each icon has one or more inputs and outputs, for example a multiplexor may have a 1 to N interface between inputs and outputs. The computer programmer selects the icon 210 from the tool box 200 and drags and drops it into the workspace 220 which instantiates the graphical object. The computer programmer then must connect each of the inputs 230 and outputs 240 for each of the tool box icons to designate the signal path. In the example of FIG. 2, there are two separate input signals In1 and In0. The user has selected (Modul1) a type 3 module which has two inputs and one output and could be, for example, a mixer. The user has also selected a type 1 module for preprocessing input signal In0 and a type 4 module for preprocessing input In1. The mixed signal is then sent to two outputs. Out1 is just the output of the mixer while Out0 undergoes a post mixing processing stage in a type 1 module. It should be understood that the various modules may perform any number of different functions that may be implemented on the host processor.

As stated, the computer programming software environment provides a workspace 220 in which graphical selection of a graphical icon causes instantiation of a precompiled graphical object when it is placed into the workspace. After the first object is instantiated, the computer programmer is then provided with one or more secondary objects which are capable of being coupled to the first object. The secondary objects are presented based upon the objects compatibility with the interface from the first object. One manner in which the interfaces are matched is through a naming convention wherein a first object will have an identifier and all secondary objects that have the same identifier will have a compatible interface. The computer programmer selects one of the second objects. The second object is instantiated and the interface is coupled to the second object providing access to parameters from the first object. The secondary object contains computer code representing functions of the graphical control.

Once the first object is instantiated and is coupled to a second object, a control method is called and a control object is constructed, providing a graphical control for the programmer to enter input parameters. The graphical control is provided within a graphical panel which can hold one or more controls. A graphical control may be a dial or a box for entry of data, for example. The graphical control either accepts a parameter as input by the programmer or allows for changing of the controls which produces a parameter output.

The computer programmer may then continue and select other graphical icons that represent first objects and the process repeats. The first/second object pairs are then graphically connected together providing a signal path. The graphical connection causes an ordering of the objects.

After the computer program is graphically linked together and the execution path is determined, computer code within the first/second object pair is then linked together and is compiled. The computer code (DSP, Signal Processing code or any type of code that can be compiled into specific processor instructions) in one embodiment is only resident in the second object and the computer code is taken from the second object and organized in the order according to the signal path defined by the computer programmer. The computer program code that is taken from the object and reordered is then compiled in a compiler. The compiled computer code can then be passed to a DSP as the computer code is compiled into DSP readable code (specific processor instructions). The computer code can then be passed to the DSP and executed on the DSP. It should be recognized that the computer code that resides within the second object, once compiled, is separate from the second object and is its own independent executable computer program.

The graphical representation continues to be used post compilation in order to provide parameter values to the DSP so that there may be real-time interaction between the graphical user interface that is created by the first/second objects and the executed program that is downloaded to the DSP. This is achieved through a mapping of the parameter values that are produced by the first object and the memory location within the DSP for those parameter values. This mapping is determined after the compilation of the DSP program. The mapping is done using "parameter name identification". Every parameter generated by the algorithm has a unique name. After compilation, this unique name gets assigned a DSP physical memory address. The relationship between this address and the unique names is stored as an object that links the names with the address. Therefore, when a change occurs in a control associated with the second object, the value that results from the change of the control gets passed to the linking object along with the name. This process allows the mapping of control events and values resulting from control events with physical memory addresses.

Figure 2A:
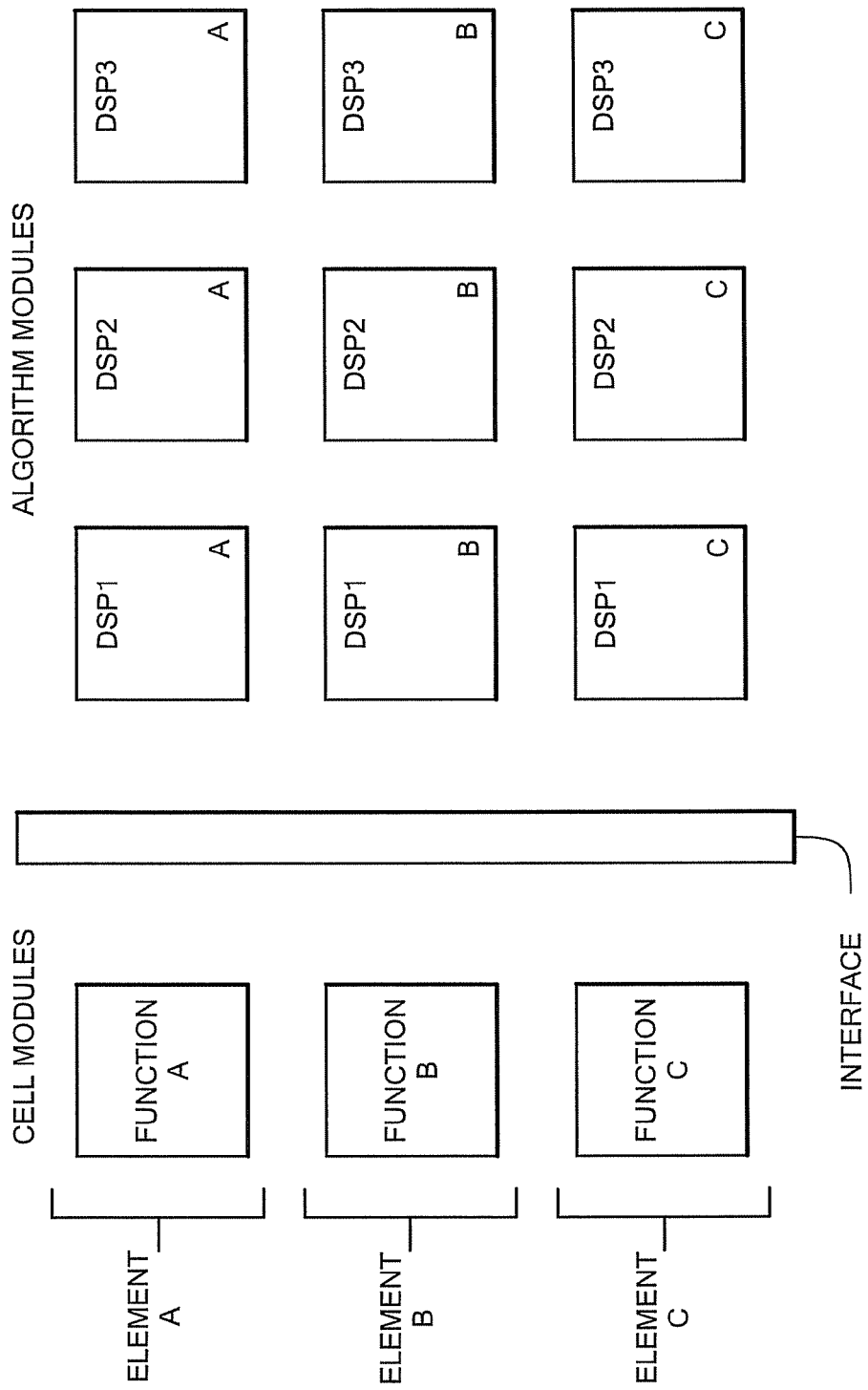
FIG. 2A shows a generalized computer code structure for a functional element being divided into a cell module and an algorithm module.

The underlying object structure is provided in FIG. 2A in which one or more functional elements to be implemented are divided into components. For example, the functional element may be a bass enhancement module for increasing the bass response of an audio signal which is represented as element A in FIG. 2A. The functional element is then divided into component parts wherein the component parts may require one or more different sets of computer code. In the following description, the terms cell module and algorithm module will be used to define the component parts and these component parts may be objects as are understood in object-oriented programming. Using the base enhancement example, a graphical user interface including the input for the input signal and the graphical controls for the bass enhancer (cell module) is separated from the digital signal processing functionality required to increase the bass (algorithm module). In such an embodiment, there may be more than one type of graphical user interface (cell module) for representing the bass enhancer. For example, the graphical user interface may display a bass enhancement module with a specific graphical icon for increasing the bass by 3 dBs for frequencies below 100 Hz. There may also be another icon representing a bass enhancement module for increasing the bass by 3 dBs below 80 Hz. Similarly, there may be more than one variation for bass enhancement. For instance, the algorithm module may contain code for bass enhancement which is specific to a particular digital signal processor and therefore there may be separate algorithms modules for each DSP. As shown in FIG. 2A, there are algorithm modules for DSP1, DSP2 and DSP3 all that are related to function A, which is the bass enhancer. Similarly the computer programming environment may have other functional elements, such as Element B and Element C which also may be associated with algorithm modules for DSP1, DSP2, or DSP3. The code for the cell module and the DSP specific code within the algorithm module are linked together by an interface which will be further explained below.

Figure 3:
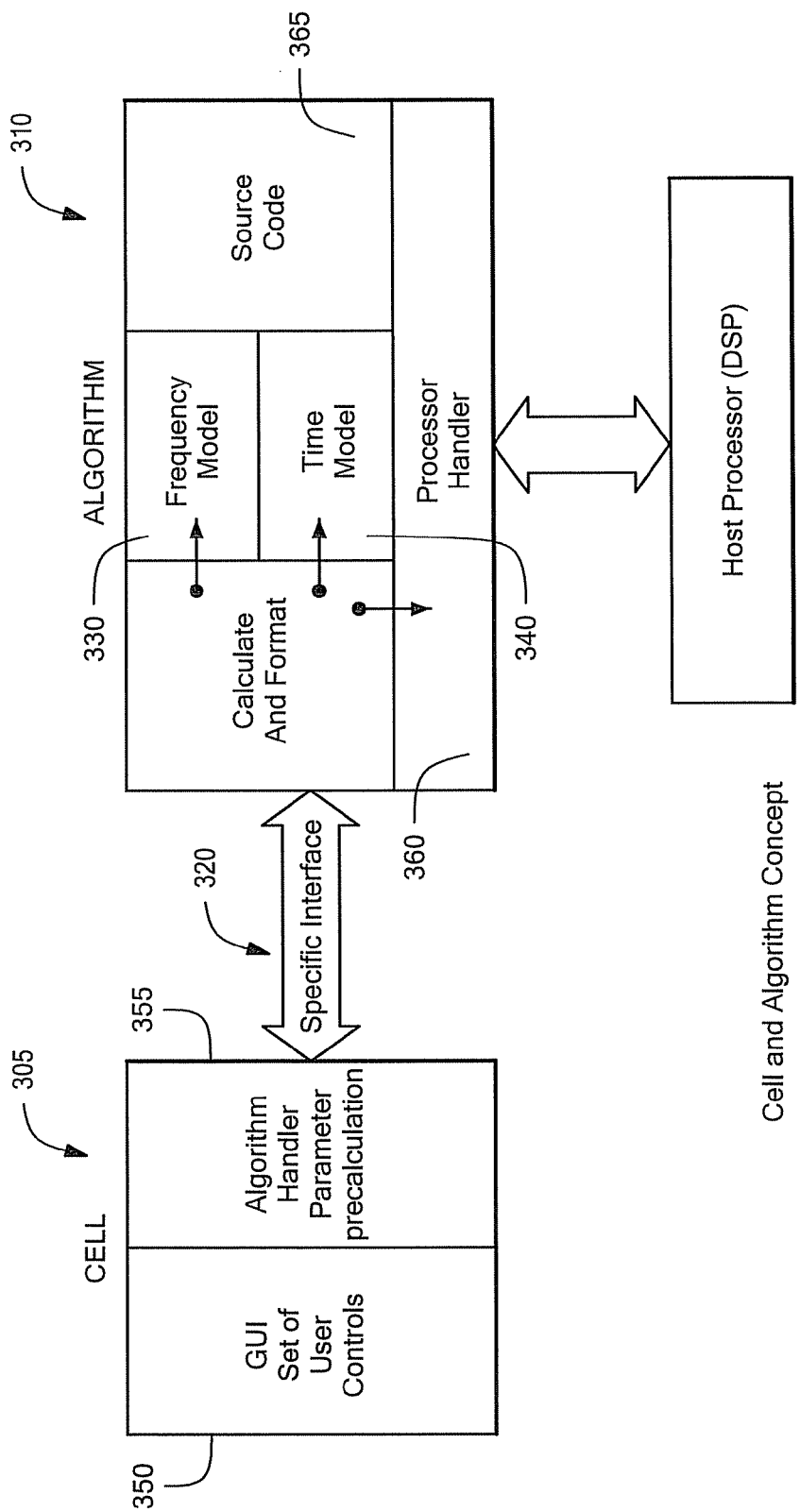
FIG. 3 shows a more detailed embodiment of the cell/algorithm structure.

FIG. 3 is a block diagram showing a more detailed view of the cell 305 and algorithm 310 modules of a functional element. It should be understood that there may be more than one cell and more than one algorithm which are each selected by a user at runtime although multiple cells and multiple algorithm modules are not shown in FIG. 3 but are more clearly shown in FIG. 2A and explained above with respect to creating a graphical computer program. In the embodiment that is shown, graphical user interface functionality (cell) 305 is separated out from digital signal processing specific functionality (algorithm) 310. For example, there may be different graphical user interface functionality that can be selected by a user, such as graphical icons that represent, multiplexors, mixers, bass enhancers, compressors, low pass filters etc as explained above with respect to the toolbox icons. Further, there may be different variations of each type of graphical icon. For example, there may be more than one cell module for a multiplexor. On the algorithm side, there may also be multiple versions of algorithm modules, for example there may be digital signal processing specific objects for a first DSP chip and for a second DSP chip for performing each of the various cell module functions (mixers, multiplexors, bass enhancers, compressors etc.) as explained in FIG. 2A.

In other embodiments, it can be imagined that functionality can be separated out and grouped in various ways. For example, there may not be a complete separation between the graphical user interface and the software code between the cell and algorithm modules. A user may select a graphical icon representing bass enhancement and will be prompted to enter a parameter for bass enhancement in the graphical user interface. The user may enter a value from 1-10 for instance. The graphical user interface may then do some pre-calculation and convert the number from 1-10 to a dB level using an appropriate function. The dB level may then be passed to the algorithm module through an interface. In this embodiment, the cell contains some computer code for altering the input parameter values from the graphical user interface and does not simply have just the code that represents the graphical user interface. In the preferred embodiment, the algorithm module contains computer code that is compilable and the cell module may contain computer code that performs calculations on input parameters; however the computer code within the cell module is not compiled and executed on the host processor. In each embodiment, the computer programmer combines the functionality from the cell and the algorithm modules together at runtime by operating in the workspace to drag and drop a cell module and associating it with an algorithm module.

In one embodiment, the cell is instantiated when the computer programmer drags and drops the graphical icon of the object on the workspace and the algorithm is instantiated when the computer programmer selects the algorithm to be associated with a cell. The cell and the algorithm are associated together through an interface 320. With this way of linking cells and algorithms together, there can be a many to one association. For example, there may be a single cell 305 that represents the function of bass enhancement; however there may be multiple algorithms 310 for bass enhancement wherein the bass enhancement cell and the multiple algorithms each share a common identifier (interface) 320.

In one embodiment, the interface 320 acts as a key to match algorithms and cells and mimics the functionality of an abstract class without any code implementation. The interface 320 may have pure virtual methods or its name may simply serve as an identifier to match algorithms and cells. The interface is an abstract data type as is understood in the C sharp programming language. In certain embodiments, the interface may be either COM interface or a .NET interface.

The cell module 305 and algorithm module 310 are associated together through a data matching structure such as an interface 320 as previously discussed. The data matching structure may be, for example, a method signature or a variable signature. As shown in FIG. 2A each function (cell) has an associated identifier, A, B, C and the corresponding algorithm that will operate with the function also has the same identifier. For example, for the function A there are three algorithm modules that will operate, one for DSP 1, one for DSP 2 and one for DSP 3. When the cell and the algorithm are linked at runtime the software will have either received a designated DSP, for example DSP2 and will therefore select the algorithm code that is appropriate for DSP2 or the computer code will prompt the computer programmer to select between DSP1, DSP2, and DSP3 as there are three associated algorithm code blocks that will function with the selected cell. A user may be allowed to associate a cell with more than one host processor. In other embodiments, as each cell is being associated with an algorithm 310, a computer programmer can select to couple different cells 305 with different host processors. In such a computer program, multiple DSPs may be employed to achieve an output signal from the resultant compiled program of the graphical programming environment.

As previously expressed, the system provides programming functionality for selection of a cell to be linked at runtime with one of a plurality of algorithm modules. Cells and algorithm modules each provide a separable functionality of a desired process. Both the cell and the algorithm are sub-elements of the desired process wherein each sub-element may take on one or more values or forms. For example as explained above, a cell 305 may be a graphical user interface and an algorithm module 310 may contain a set of functions associated with a digital signal processing chip. In such an embodiment, the desired process is a programming tool for digital signal processors that allows for the selection of parameters that are implemented within the DSP. The system provides for the programmer, the ability to select various desired functions for a digital signal processor graphically and to couple the selected process with computer code that is to be used with a specific digital signal processor. The computer code is linked together and then compiled by a DSP compiler into DSP readable code. In one embodiment, the programming code for the DSP is written in a computer language such as C sharp and is then linked together in the proper order and passed to a compiler which turns the C sharp generated code into machine readable code that is understood by the digital signal processor. In another embodiment, the algorithm code (DSP programming code) contains machine readable code. Upon linking, only the algorithm code is linked together in the proper order according to that selected by the computer programmer using the graphical icons. The machine code is then compiled so that it can be executed on the DSP. The code can then be ported to an electrically coupled DSP as shown in FIG. 1. In other embodiments, the code may be tested and run in a simulator and it is not ported to an external DSP.

Figure 2B:
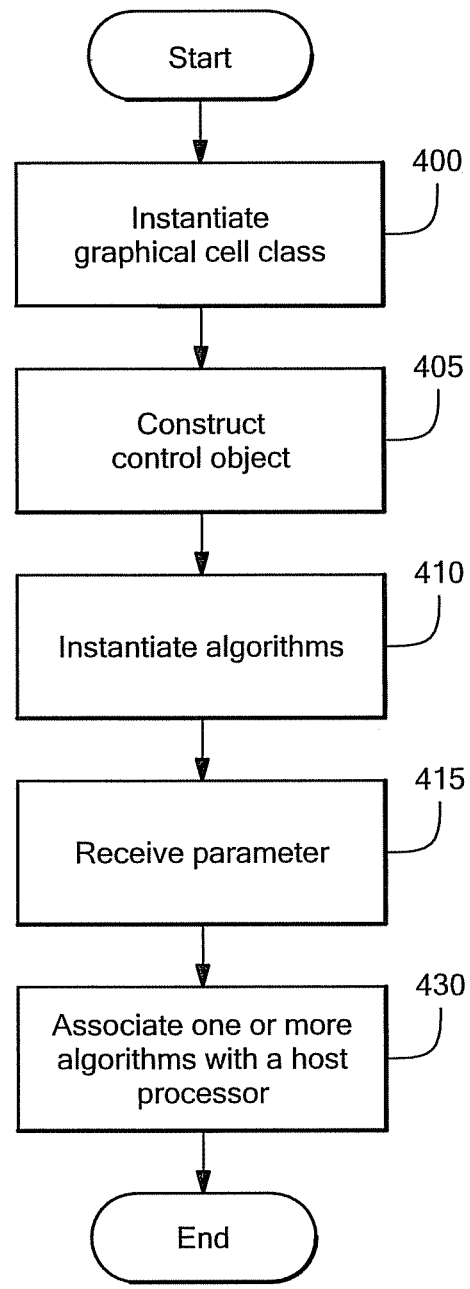
FIG. 2B is a flow chart showing an example of the steps that are employed within the graphical computer programming environment in creating a program.

FIG. 2B is a flow chart showing an example of the steps that are employed within the graphical computer programming environment in the creation of a program. The base class for the cell modules is instantiated upon a computer programmer designating that a program is to be created 400. The computer programmer may select a graphical icon, such as, a bass enhancement graphical icon, from a plurality of graphical icons. As such, the cell is selected which when dragged into the workspace instantiates the class that inherits from the base class of the cell module. The base class searches for and obtains any class attributes for the bass enhancement class. A constructor is called which constructs the bass enhancement object 400. The constructed object then causes a control to be constructed and graphically represented 405. Once the control is created, an algorithm is instantiated based upon a matching of the cell module's identifier and an identifier of the algorithm. If there are more than one algorithm modules that share the same identifier then all of the algorithms are instantiated within the graphical programming environment 410. The control requires the user to input or select a parameter, such as a bass level, for example. The bass enhancement object outputs the parameter or a function of the parameter to a cell method or a registered event. 415. This output is input into an array within the event or method. The program then sends the acquired information to all associated algorithms. The computer programmer is then queried to select one or more digital signal processors to associate the algorithms with. Based upon the selected DSP(s), the control from the cell is associated with an appropriate algorithm. 430. In other embodiments, upon initialization of the graphical computer programming environment, a user is prompted to identify what external DSP is to be used with the programming code.

Once there is a coupling between the cell and the algorithm, the computer program may enter a parameter or change the setting of a control (for example a graphical control dial). The parameter is passed to an arraylist. The computer programmer may then add one or more additional cells to the workspace and connect the inputs and outputs of the cells together to define a signal path. Each parameter for each cell is passed to the arraylist. Once the program is completed the computer programmer can link the computer code together. In such a fashion, the computer code from the algorithm is selected and placed into the proper order for linking. The algorithm modules are also passed the parameter values from the arraylist. In one embodiment, the computer code for the algorithm is written in machine readable code. The code is then compiled in a compiler such that it is in DSP readable form. During compilation, addresses are compiled of the memory locations associated with the parameter values within the DSP and the parameter locations within the arraylist. The map is reassociated with the compiled algorithm code. Once the compiled computer code is downloaded to the DSP, the computer programmer may then make adjustments to the controls of the cells graphically within the workspace and the parameter values will be passed to the interface arraylist which is then written to the proper memory locations within the DSP for real-time feedback of parameter changes.

In one embodiment, the algorithm module has several components including, a frequency response module 330 including a transfer function, a time response module 340 representative of the DSP for the selected functionality of the graphical icon and DSP specific computer code such as machine code as shown in FIG. 3. Each component of the algorithm may be employed depending on the selected graphical user interface icon and the selected or entered parameters and the initial setup of the computer programming environment. For example, the system may be initially setup to perform a simulation of the DSP functionality. The transfer function equation is used within the frequency model for the simulation. The parameters from the cell module are fed as inputs into the frequency module and a frequency response is produced as the output. In this configuration, the output is simply a simulation and the frequency response could be graphically displayed to the computer programmer, so that the computer programmer can have an understanding of how the computer program will effect the input signal. One reason for this is to simulate the expected results prior to actually linking and compiling the code in the algorithm module and implementing the code within an actual DSP.

The time domain equations of the time response module 340 are also provided for instantaneous implementation of the desired functions in real-time so that the computer programmer can hear acoustical changes that are implemented. Again, the time module 340 is used to simulate the computer code prior to linking and compiling the computer code within the algorithm module that is to be actually implemented on a DSP.

As expressed above, the cell may be a graphical user interface. The cell may contain computer program code for implementing the desired graphical user interface. For example, if the user selects a bass enhancer, the graphical user interface may include a graphical dial which can be selected and changed by the user. The computer code for implementing the dial would be contained within the cell. Additionally, the cell may contain other computer code. For example, if a user selects a low pass filter, the user may be asked to input a roll-off and a cut-off frequency for the filter. The cell may include code that takes the values input by the user for the roll-off frequency and the cut-off frequency and determines the coefficient values for the filter. The coefficient values are then output and passed to the algorithm module. As shown in FIG. 3 the cell 305 contains both the graphical user interface code 350 and an algorithm handler and parameter precalculation 355. The algorithm handler is the computer code that passes the output code to the interface as expressed above.

The algorithm module further includes a processor handler 360 which is an interface for transmitting a signal to a host processor/DSP. The interface may be a standard interface, such as RS-232, or USB, for example, which is well known in the art. The source code component 365 contains the source code that is compiled and turned into machine-readable code.

Figure 4:
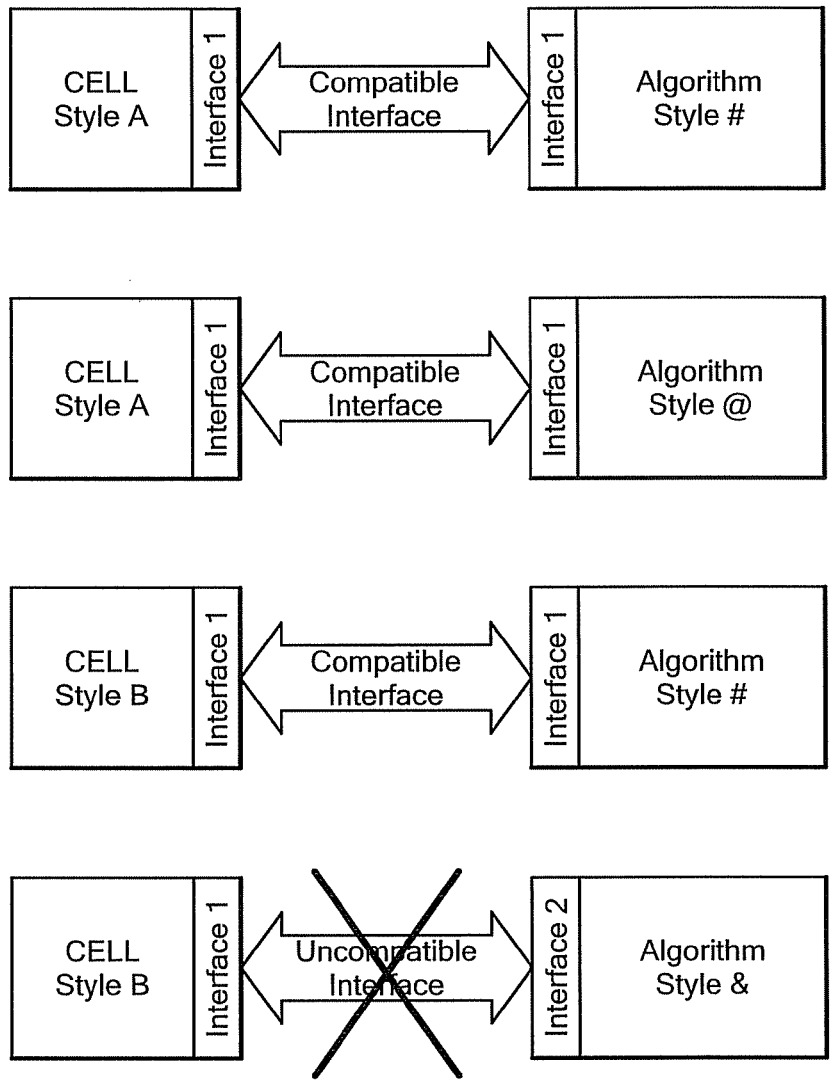
FIG. 4 is a block diagram showing the common identifier that is shared by a cell and algorithm that are connected.

FIG. 4 shows cell modules associated with appropriate algorithm modules through a common identifier. For example, a cell module having Style A is compatible with algorithm module style # and is also compatible with algorithm module having style @, since the cell and the two algorithm modules each share the same interface name, which in this example is "interface1". Similarly, a cell module having Style B is compatible with algorithm module having style # because they share the same identifier name "interface1", but cell module having style B is not compatible with algorithm module having style & because they do not share the same identifier. In such a fashion, cell modules can be reused with multiple algorithm modules and similarly a single algorithm module may work with multiple cell modules.

The cell and algorithm modules along with the interface module can be understood in greater detail using pseudo code. As shown below, a cell is grouped into a category and is provided with a description identifying the type of cell. This is shown in the example of a cell for a mixer for mixing two or more digital audio signals together.

```
[System.ComponentModel.Category("Mixers")]
[System.ComponentModel.Description("Single Control Mixer")]
```

The cell also contains code for presenting a control graphic which represents the mixer.

```
[System.Drawing.ToolboxBitmap(typeof(SingleCntrlMixerCell),
    "Icons.SingleCtrlMixer.ico")]
```

The mixer cell has certain attributes associated with it. For example the cell may be serialzable.

[Serializable( )]

The mixer cell may have an attribute which indicates that it is stackable. Stacking of a cell indicates that the cell is capable of working with more than one algorithm. So for a single instantiated mixer cell, the controls of the mixer cell may operate to control two algorithms. The algorithms may operate in a single digital signal processor or the algorithms may each be associated with a separate digital signal processor.

```
[StackingAttribute(StackingAttribute.StackDir.Single)]
[Analog.BaseLib.Cell.RequiredAlgIntf(new Type[1]
    {typeof(ISingleCntrlMixerAlg)})]
```

The cell class is defined as inheriting from a base cell class. The base cell class has certain properties. Some of the properties include the ability to add an algorithm, changing the format of the cell, changing the pin layout of the cell, creating the graphical control, receiving input to the graphical control, and providing output from the graphical control. An example of a cell class is provided below.

```
public class SingleCntrlMixerCell:BaseCell
{
        public SingleCntrlMixerCell( ):base( ){       }
        public SingleCntrlMixerCell(SerializationInfo info,
StreamingContextcontext) : base(info,context) { }
        public override void FinishDeserialize( ){ }
```

The cell includes a method for creating the control that is to be displayed within the workspace of the graphical computer programming environment.

```
        public override System.Windows.Forms.Control
CreateAlgCtrl( )
        {
                ADICtrls.newknob t = new ADICtrls.newknob( );
                t.Size= new System.Drawing.Size(40,40);
        return t;
}
```

The cell module obtains the type of control that is to be instantiated which in the case of a mixer is a graphical knob.

```
        public override System.Type GetControlType( )
        {
                return typeof(ADICtrls.newknob);
        }
}
```

The interface for the cell module and the algorithm module is a structure. The interface indicates the type of interface. The interface is an attribute of both the cell and algorithm

```
        [Analog.BaseLib.Cell.RequiredAlgIntf(new Type[1] { type of (
IsingleCntrlMixerAlg ) } ) ]
        public interface ISingleCntrlMixerAlg
        {
        }
```

The following code shows that the mixer is "repeatable". Since the mixer is repeatable, the controls for the mixer may be duplicated. The mixer may have controls which are repeated between 2 and 15 times as expressed in the attribute code. The code also indicates that the pins will grow dynamically for the input pins and the output pins will remain static and therefore there will be only a single output for the mixer.

```
        [RepeaterAttribute(2,15,RepeaterAttribute.RepeaterControl.Single,
        RepeaterAttribute.RepeaterCode.Parallel,
                        RepeaterAttribute.PinGrowth.Dynamic,
        RepeaterAttribute.PinGrowth.Static)]
```

The actual class structure for the algorithm is now provided. The type of mixer that is presented is a single control mixer which inherits from a base algorithm class. The algorithm module for the mixer has associated attributes just like the cell. For example, the algorithm is serializable and the algorithm has one input pin and one output pin as indicated in the code.

| [Serializable( )] | (this is part of the algorithm) |
| [PinsAttribute(1,1)] | (this is part of the algorithm) |

The base algorithm class has the following properties. The base algorithm includes, for example, methods for initializing pins, for duplicating pins, for obtaining the number of input pins, for obtaining the number of output pins and for controlling repetition of control panels for repeater cells.

The single control mixer is associated with a particular digital signal processor which in this example is identified as a 1953 digital signal processor. Information is streamed into and from the mixer and is provided in series from the interface.

```
public class
SingleCntrlMixerAlg:BaseAlgorithm,IDsp1953,ISingleCntrlMixerAlg
{
        public SingleCntrlMixerAlg( ):base( ) { }
        public SingleCntrlMixerAlg(SerializationInfo info,
StreamingContext context) : base(info,context) { }
        public override System.Collections.ArrayList Code
        {
          get
          {
          System.Collections.ArrayList code=new
          System.Collections.ArrayList( );
          code.Add("This is the code for the Single Control Mixer");
          return code;
          }
        }
}
```

The above code provides one example of the cell-interface-algorithm structure for an embodiment of the invention. As expressed above, cells and algorithm modules may be capable of being stacked or repeated. The mechanics for stacking and repeating will now be described.

As already stated, stacking of a cell is the process of associating algorithms with a cell and therefore allowing user input to the algorithms through a single graphical user interface that is provided by the cell. The instantiation of a new algorithm, inherently requires the adding of input(s), output(s) or both input(s) and output(s) to a cell. Within the object structure of the algorithm, the algorithm maintains control over the inputs and the outputs even though the cell objects graphically represent the inputs and the outputs. In stacking, the graphical user interface which is represented as a control (dial, slider etc.) may or may not be repeated and is dependent upon the configuration of the cell object. For example, an equalizer may require that the controls are repeated, to independently control each additional input, whereas a delay may have only a single control for multiple inputs. A benefit of stacking is that a single graphical control, controls multiple algorithms and provides a better user interface which is easier to control. Further there is less duplication of computer code for the graphical control of the cell.

Figure 5:
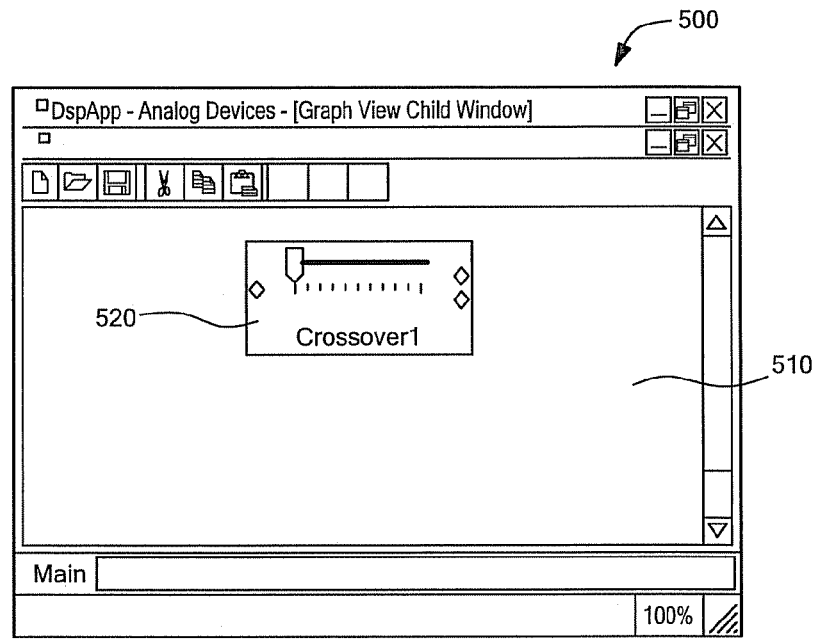
FIGS. 5-8 are screen shots showing the process of stacking.
Figure 6:
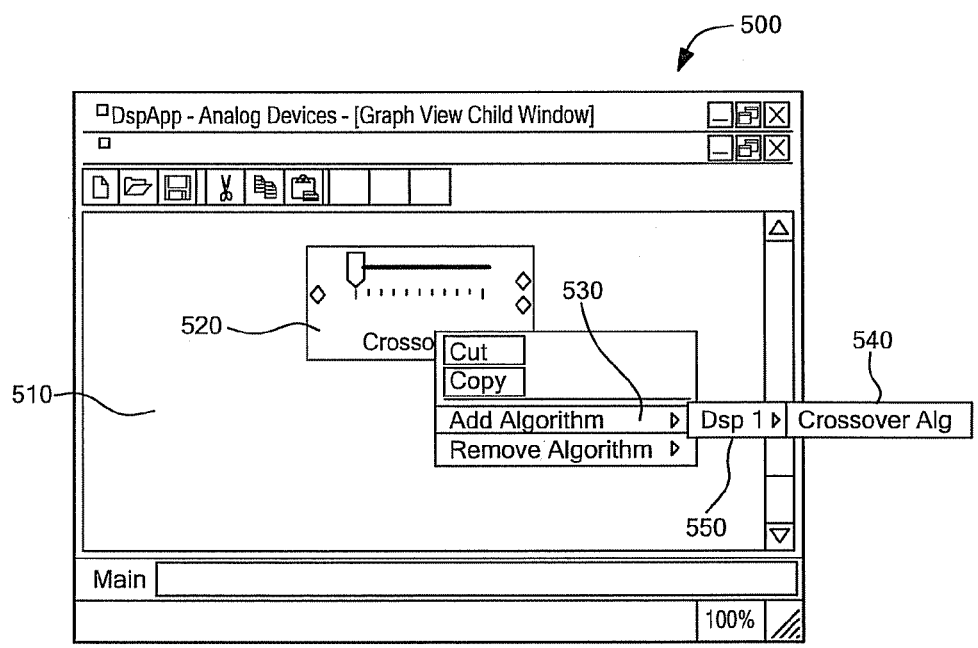
Figure 7:
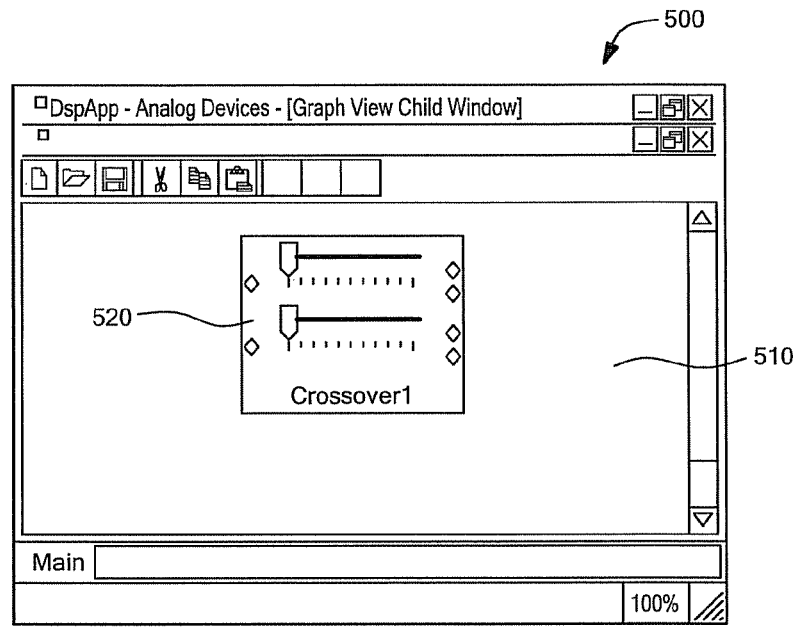
Figure 8:
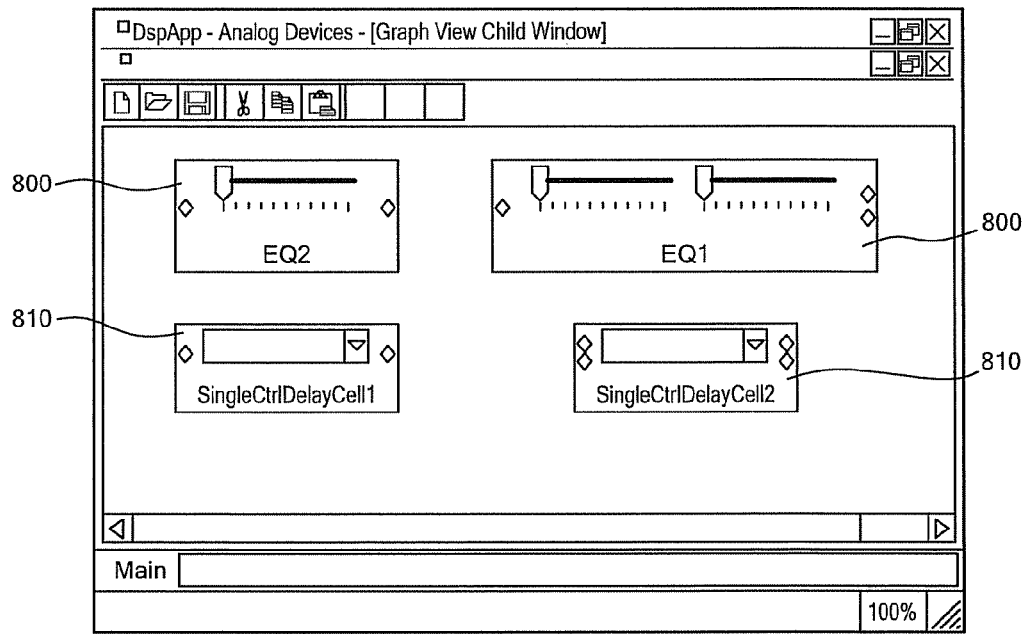

FIG. 5 shows a screen shot 500 for implementing stacking. In this Fig., a workspace 510 is open and a digital signal processor has been selected. Further, in the Fig. that is shown a crossover cell 520 has been instantiated and a corresponding algorithm for the particular DSP has been instantiated. As the user selects the cell, the user is provided with a context menu that provides the user the ability to add an algorithm 530. This step is shown in FIG. 6. The user selects add algorithm and then selects the algorithm to add from an available selection 540 of digital signal processors 550. For example, here only one DSP was initialized and it is named DSP1 550. The user is provided with a listing of available algorithms 540 which in this case there is only a single algorithm available which is entitled crossoverALG. As shown in FIG. 7 the algorithm is added as is indicated by the addition of input and output pins on the graphical control. This cell allows vertical growth which is an attribute of the crossover cell. Since the cell allows vertical growth the control is repeated vertically within the graphical panel for the control. To clarify, besides adding a graphical control to the cell panel, an algorithm instance is added as well. Since, inputs and outputs are associated with the algorithm, the addition of the inputs on the graphical control is an indicator that the algorithm has been instantiated. It should be recognized that other control directions may also be implemented. In this example, the attribute was identified as vertical and thus the crossover repeated its control in the vertical direction. However, the attribute may also be set to horizontal or to none and thus the control for the algorithm may repeat in the horizontal direction or the control will not repeat at all. In any event, when an algorithm is instantiated, input and output pins are added. FIG. 8 shows an example of horizontal stacking for EQ2 800 and also no stacking for SingleCtrlDelayCell1 810.

Figure 9:
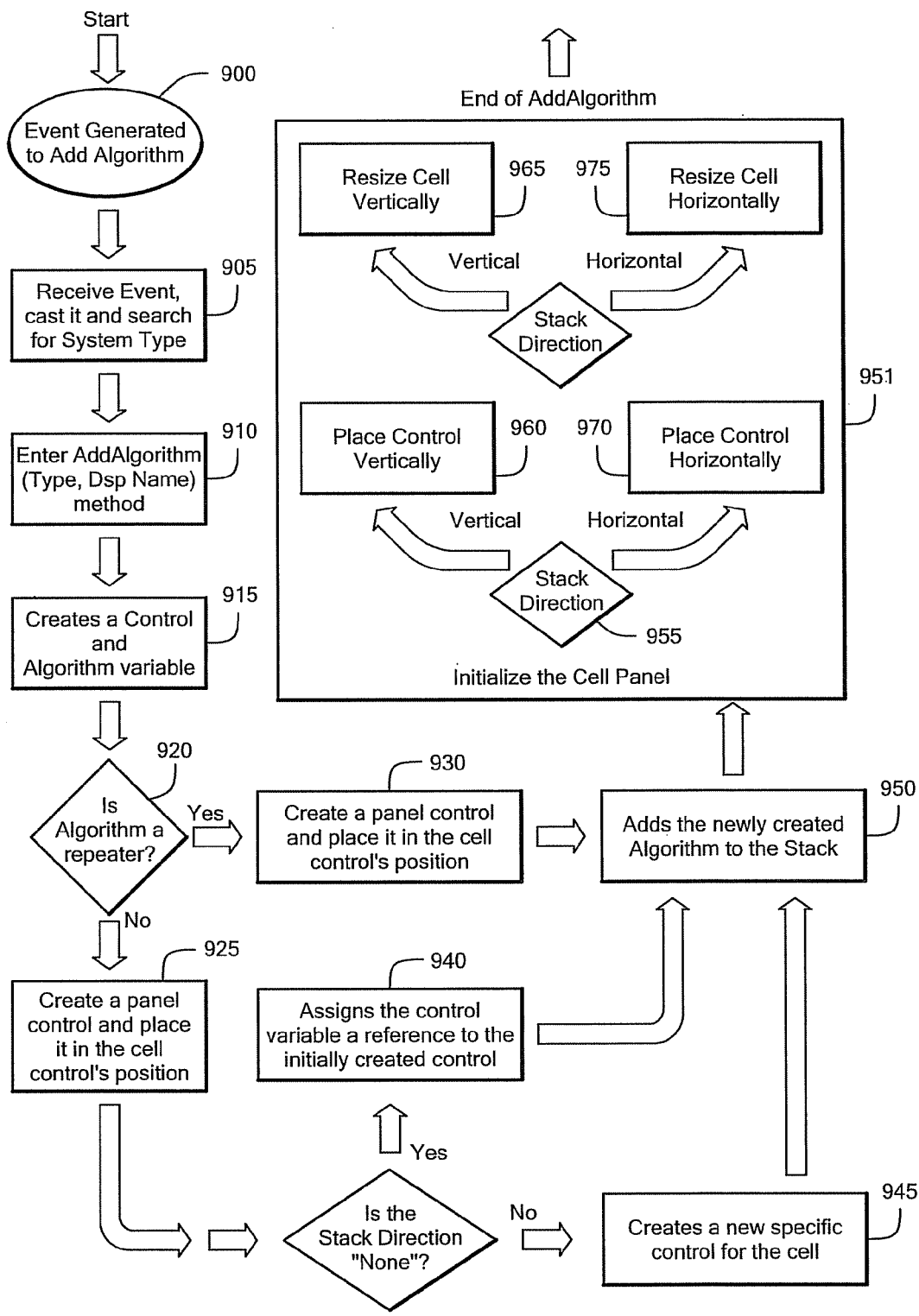
FIG. 9 is a flow chart of the stacking process.

The procedure that is implemented within the computer code is explained in the flow chart of FIG. 9. A computer programmer selects to add an algorithm to a pre-selected cell. An event is generated to add an algorithm 900. The event is received and cast and the system type is searched 905. The method searches to find all algorithms that may be associated with the cell type that has been previously selected. Similarly, the algorithms are limited based upon the DSP which is initialized. Once the name is identified, the particular type of add algorithm method is specified 910. An algorithm module is then selected by the computer programmer. A user control and algorithm variable object is created 915. The object is then checked to see if the algorithm object is a repeater algorithm 920. If the algorithm is a repeater object then the algorithm object causes another control to be added to the cell 930. The newly created algorithm is added to the stack 950. If the algorithm is not a repeater object, a control is created and placed in the cell's panel position including new inputs and outputs according to the selected algorithm 925. The attribute regarding stacking is then identified. The stacking attribute may have one of three different characteristics. The algorithm may stack vertically, horizontally or not stack at all. First the stack direction attribute is checked to see if it is "none" 935. If the stack direction is none, the algorithm assigns the algorithm's control variable to the initially created control for the cell 940. If the stack direction is something other than none, the algorithm calls the cell object and creates a new instance of the specific control 945.

The new algorithm is then added to the stack 950. Once the algorithm is added to the stack, the cell panel is initialized 951. Once the cell panel is initialized, the stack direction is obtained 955. If the stack attribute is a vertical stack, the new control is added to the graphical display of the cell panel in a vertical direction 960. The cell is then resized in the vertical direction so that the controls fit into the cell panel 965. If the stack direction is listed as the horizontal direction then the control is added to the cell panel in a horizontal direction 970. The cell panel is then resized so that it fits within the original display space 975.

Figure 10:
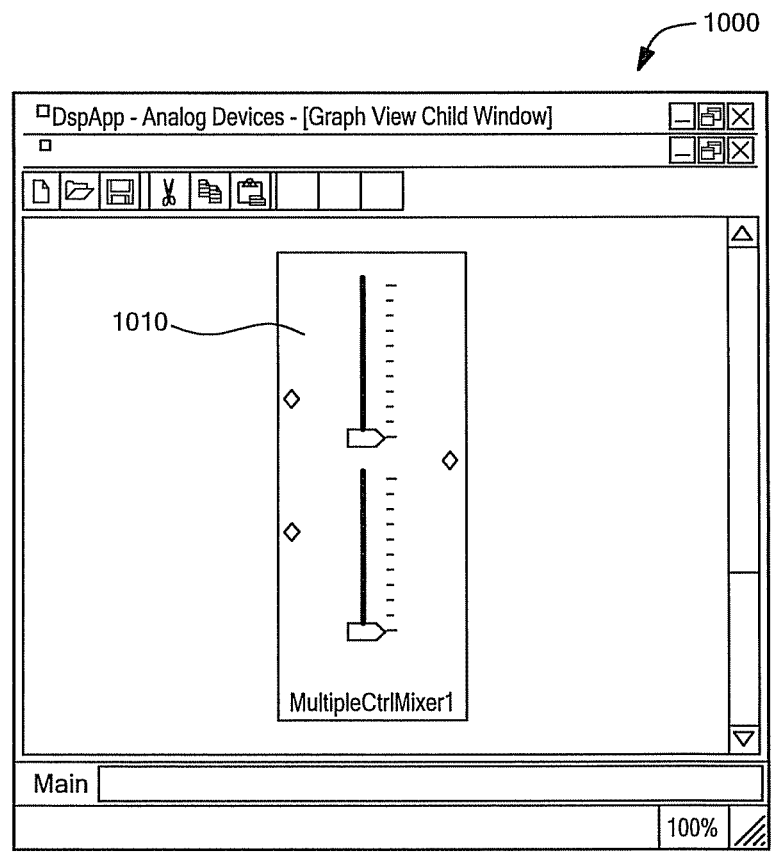
FIGS. 10-13 show screen shots of repeating.
Figure 11:
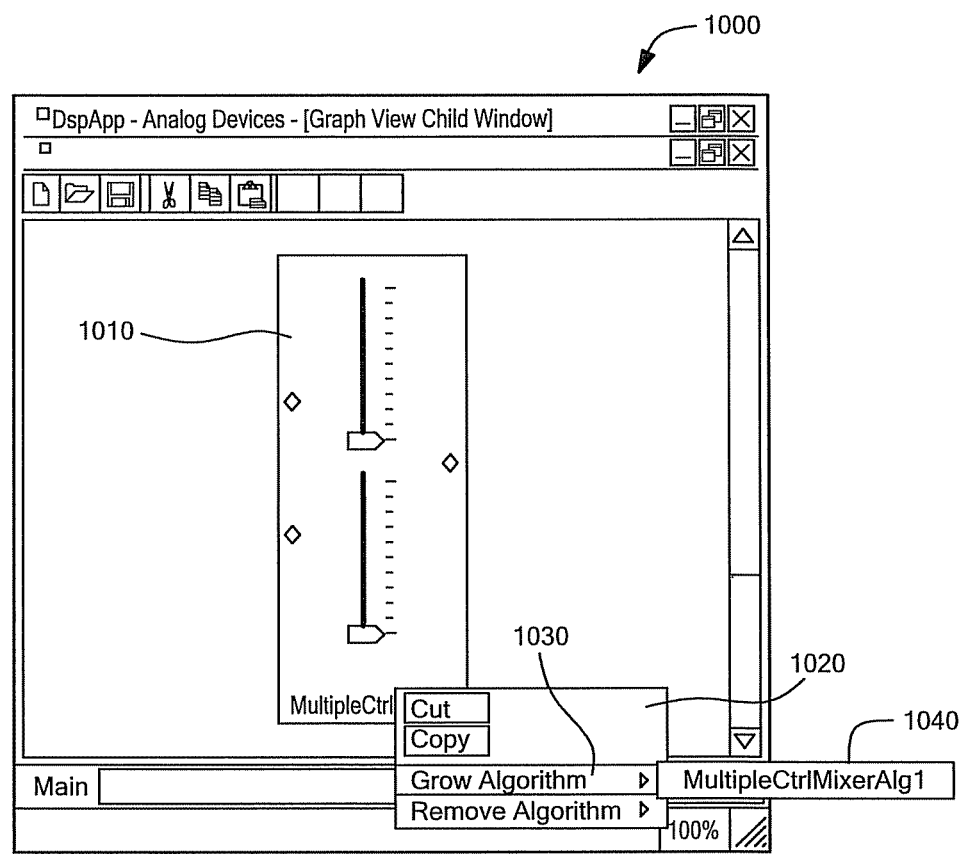
Figure 12:
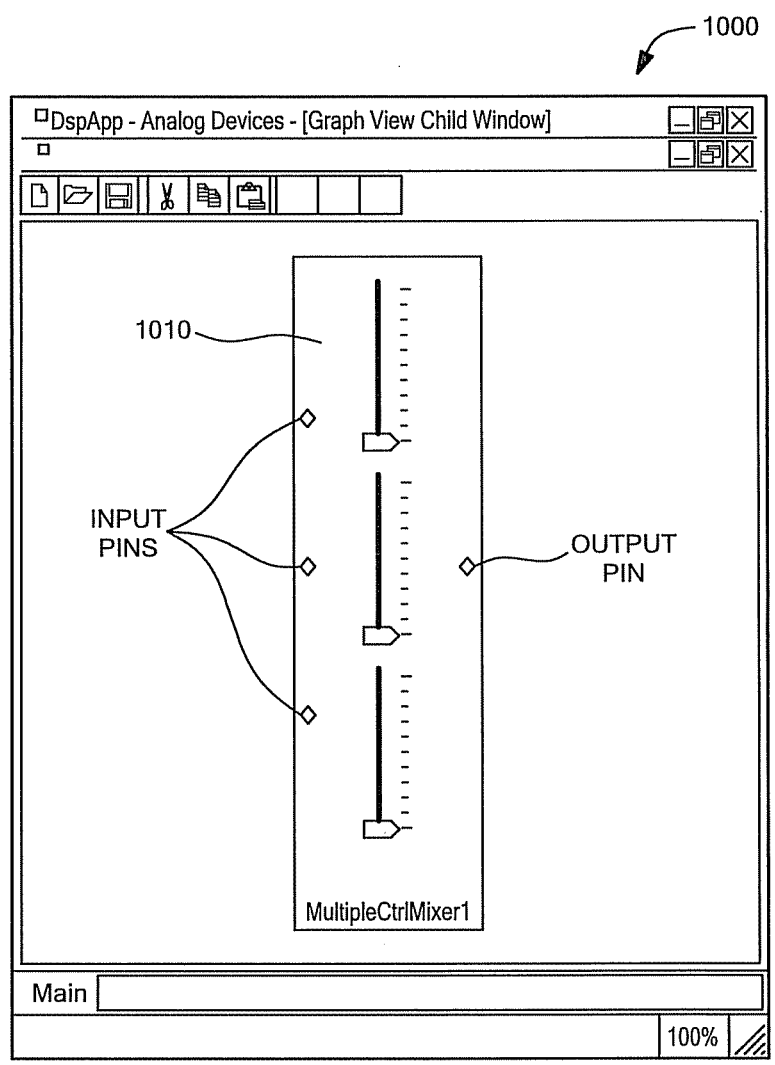

The repeating process differs from the stacking process. Where the stacking process allows two or more algorithms to be associated with a single cell, the repeating process modifies the code within the algorithm that is to be compiled into host processor readable code so that the algorithm loops. Repeating the algorithm is the process of repeating the same algorithm and modifying the associated host processor readable code as opposed to adding a new algorithm. The repeating of an algorithm may or may not involve the addition of a control to the graphical display of the cell, but in any event the number of inputs and outputs are increased in the graphical representation of the cell. The process of repeating is shown in the following Figs such that the graphical representation of the cell is modified. In FIG. 10 a workspace 1000 of the graphical programming environment is shown in which a multiple control mixer cell 1010 has been instantiated and associated with a corresponding algorithm object. A computer programmer can right click on the graphical representation which causes a context menu 1020 to appear. The user can select "grow algorithm" 1030 as shown in FIG. 11 because there is at least one repeatable algorithm available for selection. The computer programmer is presented with a further context menu that allows the computer programmer to select the algorithm to repeat 1040. In this example, there is only a single algorithm that can be repeated and that is the multiple control mixer algorithm (MultipleCtrlMixerAlg1). The algorithm has associated repeater attributes including whether the inputs and outputs are repeated and whether the controls are repeated and in what direction for the cell panel. As shown in FIG. 12 the input pins are repeated and the output pin is static. The algorithm also causes the control for the mixer to be repeated in the vertical direction. As such, the mixer now has three inputs and one output and a third slider bar is presented in the graphical representation. The code within the algorithm is also altered such that the mixing process operates on three inputs.

Figure 13:
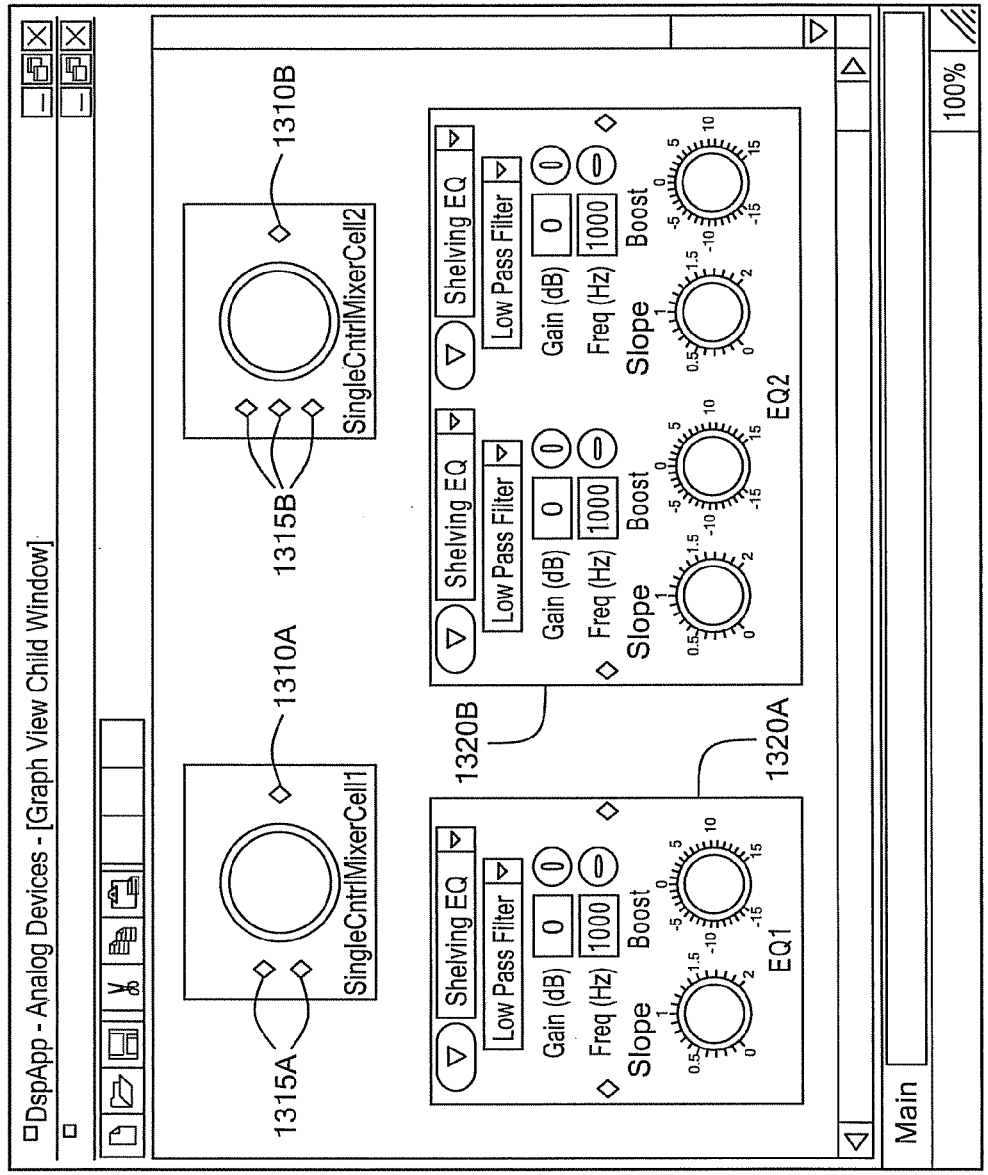

FIG. 13 shows the before 1310A and after 1310B states of a single control mixer 1310 which is non-repeatable and an equalizer which is horizontally repeatable. As can be seen from the single control mixer, two inputs 1315A are increased to three inputs 1315B and the control is not repeated. For the EQ 1320A, 1320B, the controls of the equalizer are repeated in the horizontal direction, however the inputs and the outputs remain fixed.

Figure 14:
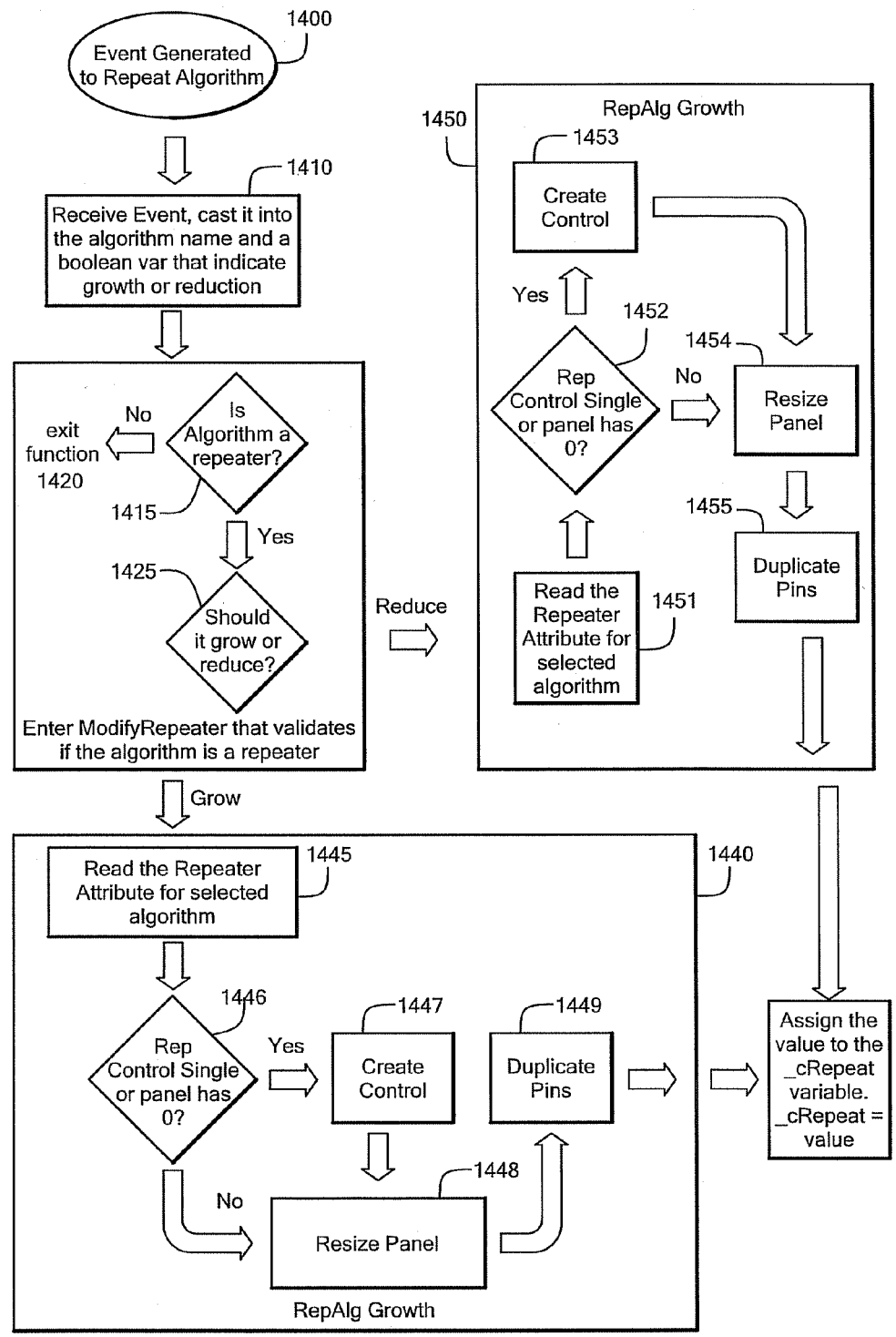
FIG. 14 is a flow chart of the repeating process.

The process for repeating an algorithm is demonstrated in the flowchart of FIG. 14. First an event is generated when a user clicks on a graphical representation of a cell that is associated with an algorithm 1400. The event is received in a method, (GrowReduceAlgorithm) in which the relevant information is extracted from the event as to whether the user wants to grow or reduce the algorithm 1410. Type casting may also be done at this step if necessary. The method proceeds by inquiring whether the selected algorithm is a repeater algorithm 1415. If the algorithm is not a repeater algorithm, the method ends 1420. If the algorithm is a repeater algorithm, the user is then provided with an interface and the user indicates whether they want to grow the algorithm or reduce the algorithm which is provided to the method 1425. If the user indicates that they wish to grow the algorithm 1440, the attributes associated with being a repeater algorithm are accessed 1445. The method then inquires whether the controls are repeatable for the given algorithm 1446. If the answer is yes, a graphical control is created 1447 and added to the cell panel that holds the control and the cell panel is resized to fit within the workspace 1448. If the control is not repeatable then the cell panel holding the control is resized 1448. Next, any new input and output pins are added to the graphical control based upon the attributes for the algorithm 1449. As previously indicated, the algorithm may indicate that the input/output pins are to be increased if the algorithm is repeated, or the pins are not to increase. Based on the type of algorithm and the status of the attributes for the pins, the method may add pins to the graphical panel for the algorithm if required. Additionally, the computer code within the algorithm object that is to be implemented on the digital signal processor is also adapted. If additional pins are added, the variables that are associated with the pins are also increased. Further, the computer code of the algorithm is optimized as described below based upon the number of repeats.

If the computer programmer selects to reduce the number of algorithms step 1450 is begun. The repeater attributes are accessed for the selected algorithm that is to be reduced 1451. The system then checks to see if the control is a single control or if there are multiple controls 1452. If it has multiple controls a new control panel is created which has one less control 1453. If the algorithm is a non repeatable control then the control panel is simply resized or left to its present size 1454. Finally, pins are removed according to the number of algorithms that are being removed 1455. The computer code within the algorithm that is to be compiled and provided to a host processor is also adapted. The computer code is constructed so that the code is adaptable to a changes such as requests for the repeating of code and therefore the addition or reduction of input and output pins. The code for a particular algorithm, such as an input algorithm may have code which adapts depending on the number of repeats that are selected. In the following example, the code adapts for an input cell which may have multiple inputs. All of the various configurations of the input cell are accommodated within a single algorithm. As such, in this example, there may be from 1 to 4 input pins for the algorithm. This algorithm is adaptable to the pin number and the library that contains the algorithms only needs to have one algorithm rather than four algorithms. This is beneficial in terms of library management.

Further, since the algorithm module adapts to the desired number of inputs, memory resources are saved when compared to a system in which a user selects between a two-input module and a four-input module and is forced to select the four-input module when only three inputs are needed, thus wasting a memory location within the host processor. Sample code is provided below for the adaptable input algorithms.

```
if( this.Pins.Count==1 )
{
    code.Add("#define__data "+pin1+" auto");
    code.Add("nop");
    code.Add("ram["+pin1+"] = vin__l");
}
if( this.Pins.Count==2 )
{
    code.Add("#define__data "+pin1+" auto");
    pin2=((Analog.BaseLib.Pin.BasePin)this.Pins[1]).Name+"__out";
    code.Add("#define__data "+pin2+" auto");
    code.Add("nop");
    code.Add("ram["+pin1+"] = vin__l");
    code.Add("ram["+pin2+"] = vin__r");
}
if( this.Pins.Count==3 )
{
    code.Add("#define__data "+pin1+" auto");
    pin2=((Analog.BaseLib.Pin.BasePin)this.Pins[1]).Name+"__out";
    pin3=((Analog.BaseLib.Pin.BasePin)this.Pins[2]).Name+"__out__l";
    code.Add("#define__data "+pin2+" auto");
    code.Add("#define__data "+pin3+" auto");
    code.Add("nop");
    code.Add("ram["+pin1+"] = vin__l");
    code.Add("ram["+pin2+"] = vin__r");
    code.Add("ram["+pin3+"] = vin__l");
}
if( this.Pins.Count==4 )
{
    code.Add("#define__data "+pin1+" auto");
    pin2=((Analog.BaseLib.Pin.BasePin)this.Pins[1]).Name+"__out";
    pin3=((Analog.BaseLib.Pin.BasePin)this.Pins[2]).Name+"__out__l";
    pin4=((Analog.BaseLib.Pin.BasePin)this.Pins[3]).Name+"__out__l";
```

-continued

```
    code.Add("#define__data "+pin2+" auto");
    code.Add("#define__data "+pin3+" auto");
    code.Add("#define__data "+pin4+" auto");
    code.Add("nop");
    code.Add("ram["+pin1+"] = vin__l");
    code.Add("ram["+pin2+"] = vin__r");
    code.Add("ram["+pin3+"] = vin__l");
    code.Add("ram["+pin4+"] = vin__r");
}
```

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

What is claimed is:

1. A non-transitory computer readable medium having computer code thereon, the computer code capable of running on a computer system, the computer code for creating a digital signal processing (DSP) executable computer program for execution on a selected digital signal processor having a specific instruction set, the computer code comprising:
    computer code for receiving user input selecting a digital signal processor from a plurality of digital signal processors to be programmed on a computer system;
    a plurality of cell modules, each cell module for graphically-representing, on the computer system a distinct digital signal processing function;
    a plurality of algorithm modules, at least two of the algorithm modules associated with different digital signal processors from the plurality of digital signal processors wherein each algorithm module provides functional code for implementing a digital signal processing function on a digital signal processor wherein the functional code is written for the specific instruction set of the digital signal processor;
    computer code for associating a first user-selected cell module with one of the plurality of algorithm modules and for associating a second user selected cell module with one of the plurality of algorithm modules wherein each associated algorithm module is based on the selected digital signal processor and the associated user-selected cell module;
    computer code for compiling the functional code into a digital signal processing executable computer program for the instruction set of the selected digital signal processor; and
    computer code for porting the digital signal processing executable computer program to the selected digital signal processor.

2. The non-transitory computer readable medium according to claim 1, wherein the functional code of each algorithm module is pre-compiled code for a specific digital signal processor having an associated instruction set.

3. The non-transitory computer readable medium according to claim 1, wherein the functional code is executable on a digital signal processor having a specific instruction set.

4. The non-transitory computer readable medium according to claim 1, wherein at least a plurality of the algorithm modules are associated with different digital signal processors wherein each digital signal processor has its own specific instruction set.

5. The non-transitory computer readable medium according to claim 1, wherein the algorithm module contains computer code which once compiled and executed on a remote processor will access the parameter input within the list.

6. The non-transitory computer readable medium according to claim 1 further comprising:
computer code for graphically connecting a first cell module with a second cell module defining an execution path; and
computer code responsive to the association of the cell modules with the algorithm modules, linking the functional code from the associated algorithm modules according to the execution path.

7. The non-transitory computer readable medium according to claim 1 wherein the cell module includes computer code for receiving parameters through the cell module on the computer system and providing the parameters to an input of the distinct digital signal processor.

8. The non-transitory computer readable medium according to claim 1 further comprising computer code for associating the parameters received through the cell module on the computer system with an array list that is part of the DSP executable computer program executed on the distinct digital signal processor.

9. The non-transitory computer readable medium according to claim 1 wherein the computer system has an associated instruction set.

10. The non-transitory computer readable medium according to claim 9 wherein the computer code of the cell module is precompiled code for the associated instruction set of the computer system.

11. The non-transitory computer readable medium according to claim 1 wherein the cell module includes graphical code that is instantiated on the computer system upon selection by the user and that includes code for receiving in user settable parameters and passes the parameters to the complete digital signal processing executable computer program executed on the specific digital signal processor.

12. A graphical system comprising a computer for developing a programming module for operation on a selected digital signal processor from a plurality of digital signal processors, each digital signal processor having an associated instruction set, the system comprising:
a graphical programming workspace viewable on a display device;
a plurality of selectable cell modules each cell module representing a distinct signal processing function becoming selected upon being placed into the workspace, which cell modules do not have fixed digital signal processor code that will ultimately implement the desired function distinct signal processing function on a specific digital signal processor having a specific instruction set; and
a functional association module for associating functional code with a selected cell module wherein the functional code is code configured to implement the distinct signal processing function on the selected digital signal processor according to the specific instruction set of the selected digital signal processor, and is selectable from a set of functional code for different digital signal processors having different instruction sets, wherein the set of functional code is provided based upon a selected cell module and based upon the selected digital signal processor from a superset of functional code; and
a computer having an associated instruction set different from the instruction set of each of the plurality of digital signal processors.

13. A graphical system according to claim 12, further comprising: a connection module allowing user connection between two or more cell modules provided in the workspace defining an execution path.

14. The graphical system according to claim 13, further comprising: a digital signal processor compiler module which will compile the functional code according to the execution path for the instruction set of the selected digital signal processor.

15. The graphical system according to claim 14, further comprising: a code conversion module that converts the compiled code into digital signal processor executable code for the instruction set of the selected digital signal processor.

16. The graphical system according to claim 15 wherein the functional association module associates computer code wherein once the computer code is compiled, the computer code can be ported to the selected digital signal processor and executed on the digital signal processor.

17. The graphical system according to claim 15, wherein a user may select more than one digital signal processor wherein each digital signal processor has its own instruction set and the conversion module converts the compiled code into digital signal processor executable code for the instruction set of each of the selected digital signal processors.

18. The graphical system according to claim 14, further comprising: a parameter module for receiving parameter values from one or more cell modules wherein the selected digital signal processor executing the compiled code retrieves the parameter values from the parameter module.

19. The graphical system according to claim 14, further comprising: a parameter module for receiving parameter values from one or more cell modules wherein the selected digital signal processor executing the compiled code receives the parameter values or a modified form of the parameter values from the parameter module.

20. The graphical system according to claim 12 wherein graphical system receives as input selection of a distinct digital signal processor from a set of digital signal processors, wherein each digital signal processor of the set has a specific instruction set and the functional association module uses the selection to determine functional code that is presented for selection based upon the specific instruction set of distinct digital signal processor.

21. The graphical system according to claim 12, wherein the cell module contains one or more object files and the object files define a graphical control on a display device.

22. The graphical system according to claim 12, wherein the functional association module interfaces functional code which can be compiled and executed on a selected digital signal processor with object code representing the selected digital signal processing function operational on the computer.

* * * * *